INVENTORS
ORVILLE R. BRELSFORD,
GORDON L. STONE &
JOHN E. ALDRIDGE
BY
ATTORNEY

Oct. 9, 1956   O. R. BRELSFORD ET AL   2,765,605
BAG MAKING, FILLING AND SEALING MACHINE
Filed May 8, 1952   8 Sheets-Sheet 4

INVENTORS
ORVILLE R. BRELSFORD,
GORDON L. STONE &
JOHN E. ALDRIDGE
BY
*H. A. McGrew*
ATTORNEY Oct. 9, 1956     O. R. BRELSFORD ET AL     2,765,605
BAG MAKING, FILLING AND SEALING MACHINE Filed May 8, 1952     8 Sheets-Sheet 6

INVENTORS
ORVILLE R. BRELSFORD,
GORDON L. STONE &
JOHN E. ALDRIDGE
BY

ATTORNEY

Oct. 9, 1956     O. R. BRELSFORD ET AL     2,765,605
BAG MAKING, FILLING AND SEALING MACHINE
Filed May 8, 1952           8 Sheets-Sheet 8

INVENTORS
ORVILLE R. BRELSFORD,
GORDON L. STONE &
JOHN E. ALDRIDGE

BY
*W. A. McGrew*
ATTORNEY

United States Patent Office 2,765,605
Patented Oct. 9, 1956

2,765,605

BAG MAKING, FILLING AND SEALING MACHINE

Orville R. Brelsford, Gordon L. Stone, and John E. Aldridge, Denver, Colo., assignors to Cup Brew Coffee Bag Company, Denver, Colo., a corporation of Colorado Application May 8, 1952, Serial No. 286,698

23 Claims. (Cl. 53—180)

The present invention relates to a bag making, filling and sealing machine. It has to do particularly although not exclusively, with a new and improved machine for bagging predetermined quantities of coffee in small bags for individual cup use, in which the bag material is heat sealable and is intended for use by immersing in hot water, as in a cup from which the coffee is to be drunk. The coffee-filled bags produced by the present machine serve to supplant the usual brewing equipment for coffee and have met with ready acceptance and widespread use. It will be understood, however, that the machine of the present invention may be used for producing, filling and sealing bags for containing various other commodities such as, to mention a few, sugar, dried beans, dried peas, jelly beans, etc., including liquids, pastes, granulated or ground or powdered commodities, as well as solids of regular or irregular shape.

One of the important objects of the present invention is to provide a new and improved machine of the foregoing character which is capable of automatically producing, at low cost, in large quantities and in rapid succession, containers, such as bags or packets, which may be varied in size to meet the demand and in which the amount or quantity of the commodity used to fill the bags may be accordingly varied.

Another object of the present invention is to provide a new and improved machine as aforesaid having improved means for effecting the change in the size of the bags produced and also improved means for varying the quantity or amount of the commodity used to fill these bags.

A further object of the present invention is to provide a high speed machine of the foregoing character which is preferably operated by electric motive power and whose operations of forming, filling and sealing the bags are entirely automatic.

Another object of the present invention is to provide a new and improved bag making, filling and sealing machine in which bags are formed by the uniting and sealing together of two independent strips of material, the individual and successive bags being filled with predetermined quantities of the desired commodity, and in which the formed, filled and sealed bags are severed and discharged from the machine, all such operations being automatic.

A further object is to provide an improved machine or apparatus in which the dies, while performing the function of forming and sealing three sides of a container, such as a bag or packet, simultaneously seal the fourth side of the next preceding partially formed and sealed bag or packet.

The foregoing and other objects and advantages of the present invention will appear from the following description and appended claims when considered in connection with the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the inventive features are capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

The machine of the present invention preferably is powered by a fractional horsepower motor and employs a reciprocating action which utilizes the principle of having two relatively heavy dies or die assemblies, either or both of which may be heated, come together with impact and under pressure and thereby seal together portions of two continuous strips of heat sealable material into a three-sided packet, pouch or bag. It also utilizes the principle of measuring desired or predetermined quantities of a fluent material and delivering such a measured quantity into each such three-sided bag so formed, by a sequence type of measuring and feeding device or assembly operating in synchronization with the oscillatory action of the sealing assembly. The machine also utilizes the principle of advancing two opposed continuous strips of heat sealable material into position between coactive sealing dies, stopping such material in sealing and filling position, and then again advancing the material in synchronization with the oscillatory movement of the sealing dies and of a cutting device which severs the formed, filled and sealed bags or pockets from the continuous strip. Other principles utilized in such machine are set forth in the following detailed description of its construction.

We shall now describe the construction and arrangement of the parts and the various units or assemblies of our machine, as well as the complete operation of said machine.

Figure 1:
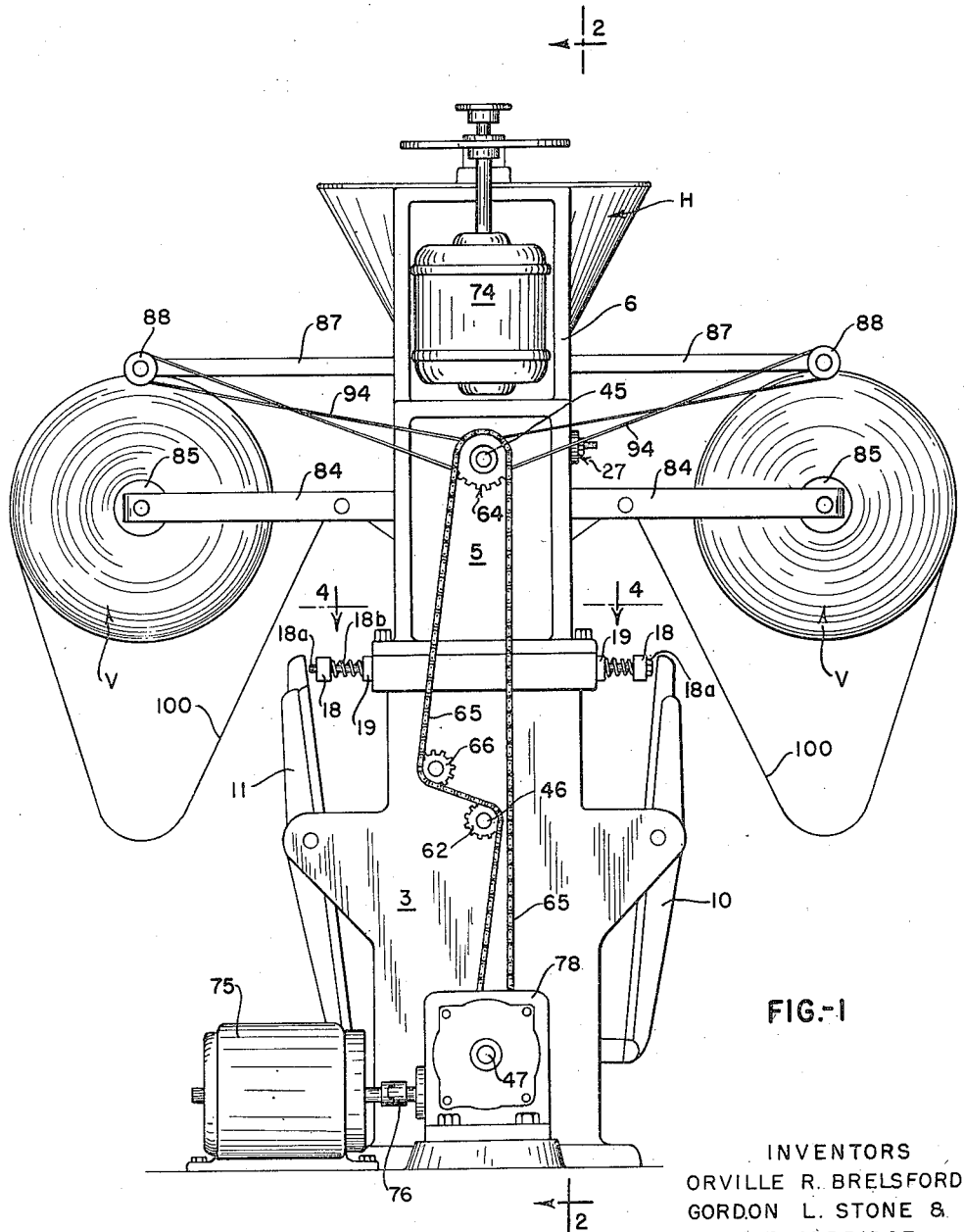
Fig. 1 is a left side elevation of the bag making, filling and sealing machine of the present invention.
Figure 2:
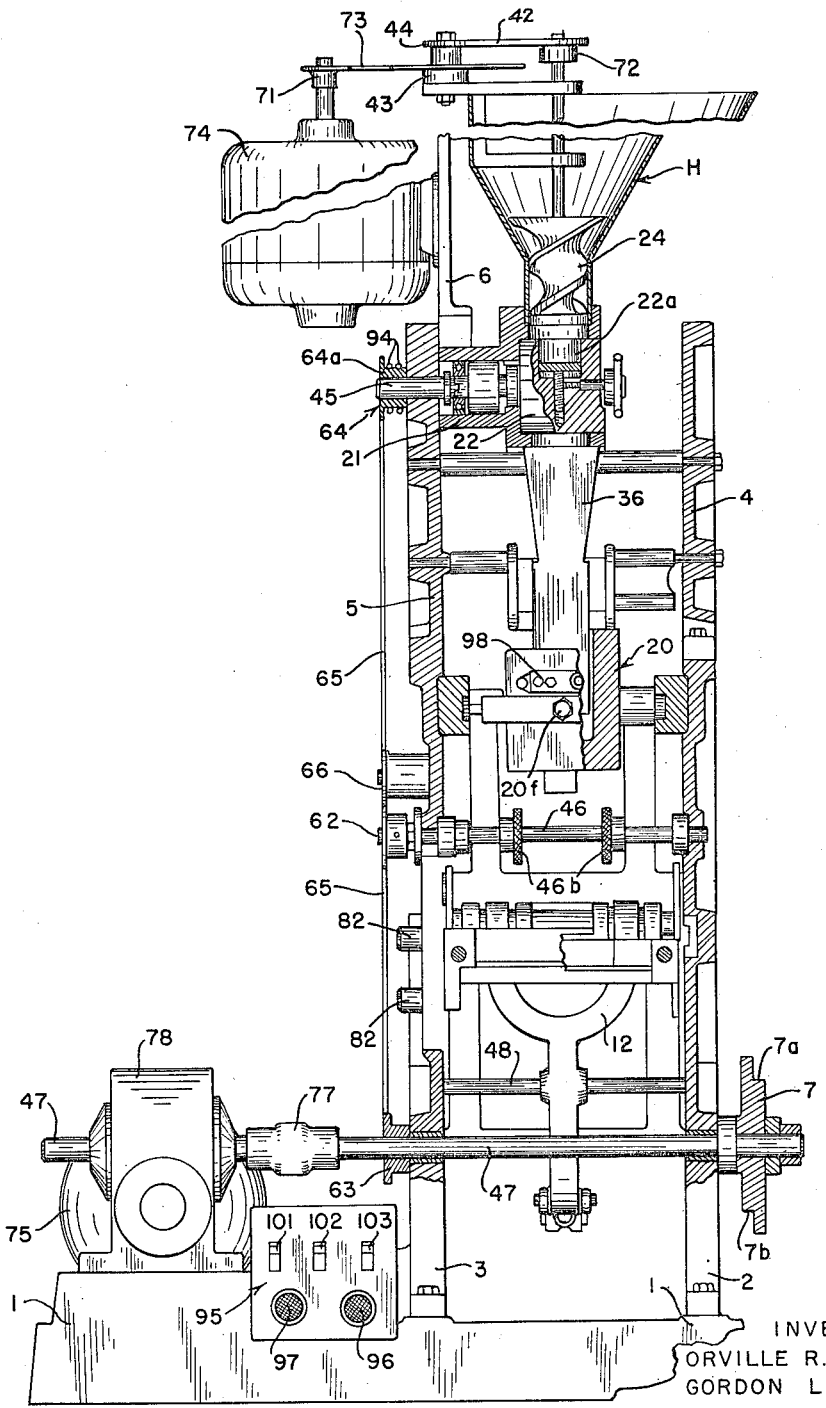
Fig. 2 is a vertical sectional view of the machine of Fig. 1, partly in elevation and partly broken away, and taken substantially along the line 2—2 of Fig. 1, looking in the direction of the arrows.
Figure 3:
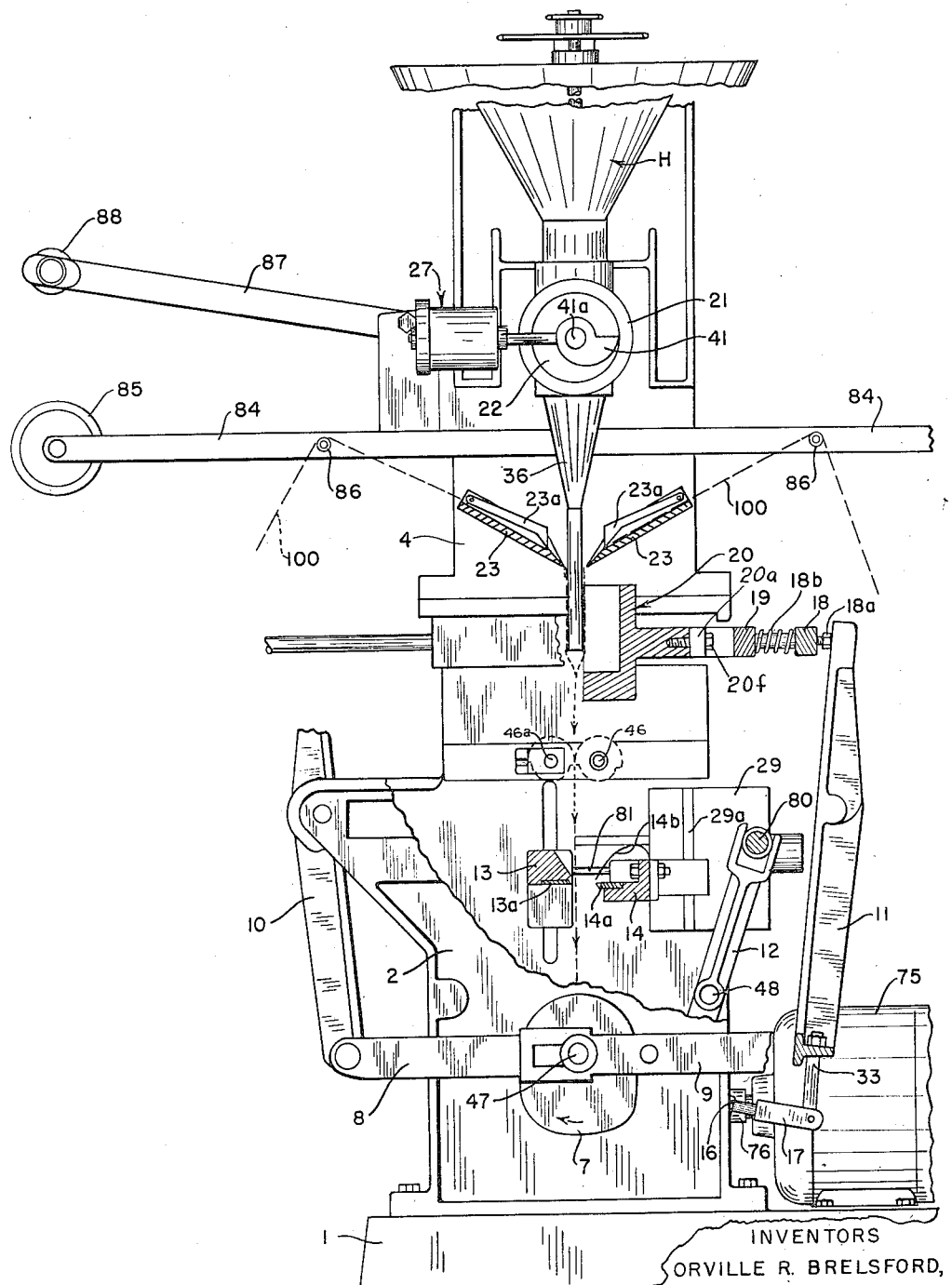
Fig. 3 is an enlarged fragmentary right side elevational view, partly in section and partly broken away, of the machine of Figs. 1 and 2.

With particular reference to Figs. 1, 2 and 3 of the drawings it is to be noted that the machine includes a base frame member 1, a right side upright frame member 2 having an upper frame portion or section 4 and a left side upright frame member 3 having an upper side frame portion 5. The frame portion or section 5 has an upper extension or projecting portion 6 which provides a mount for an electric motor 74, hereinafter described.

With the exception of the power required to stir and deliver the fluent material in the hopper H to the metering device (Fig. 8) furnished by electric motor 74 on mounting plate 6, the power required for the operation of this machine is furnished by an electric motor 75 mounted on the base 1. This power is transmitted through a gear reducer 78. The main drive shaft 47 of the machine furnishes the power for the rotation of the metering device 21, 22, the actuation of the die assemblies 20, 20, the actuation of the material advancing mechanism, Fig. 9, and the actuation of the knife assembly, Fig. 6. Viewed from the right hand side of the machine, see Fig. 3, the direction of rotation of the main drive shaft 47 is clockwise, see arrow. As the main drive shaft 47 rotates in a clockwise direction, a main cam 7 mounted on the right end thereof also rotates in a clockwise direction, and as the cam surfaces 7a and 7b, see Fig. 2, come in contact with the cam followers mounted on push rods 8 and 9, Fig. 3, those push rods are cammed in an outward direction. The push rods 8 and 9, being permanently affixed to the lower portions of rocker arms 10 and 11, respectively, in turn force these lower portions of the rocker arms in an outward direction. The rocker arms being pivoted as shown, cause their upper ends to move in an inward direction. The power of the inward thrust is accentuated by the lever principle, the upper ends of the rocker arms above their pivoted connections with frame 2 being shorter than the lower ends thereof, see Figs. 1 and 2.

Figure 4:
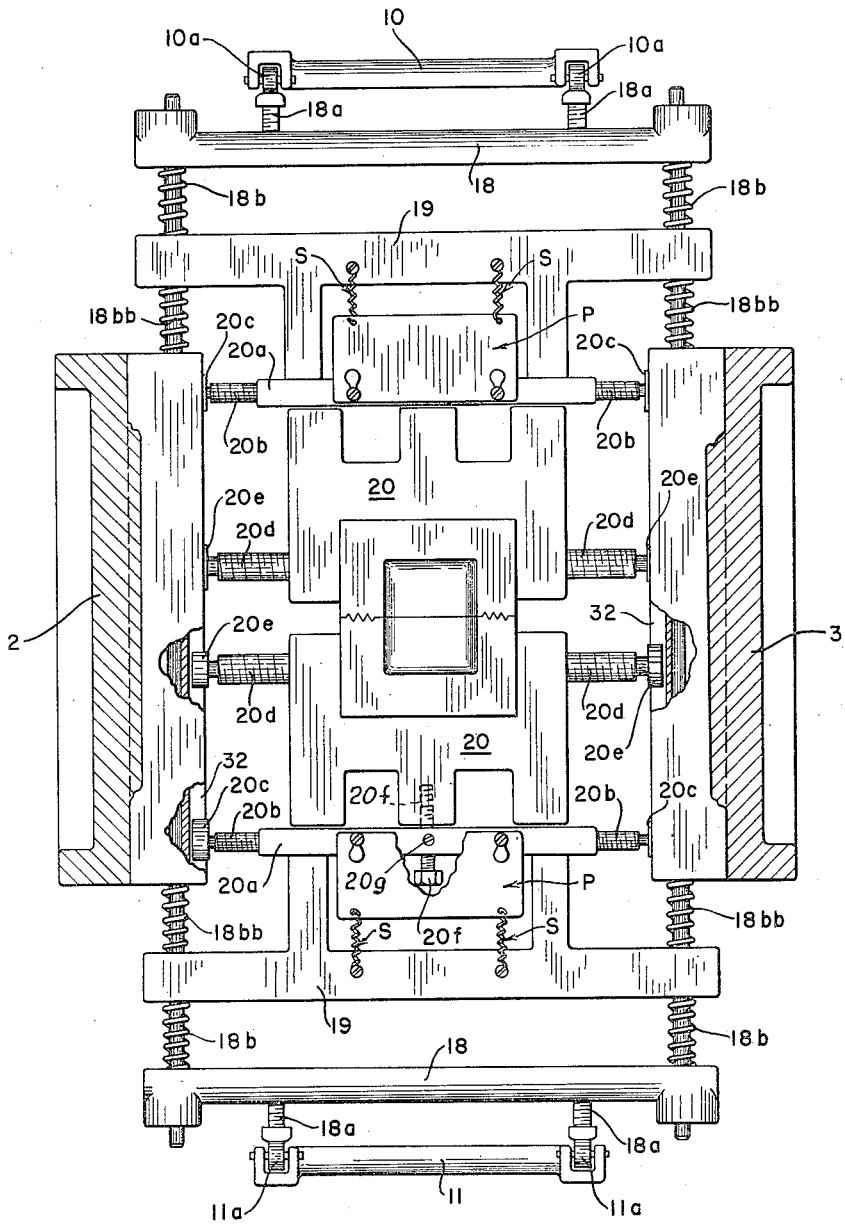
Fig. 4 is an enlarged fragmentary top plan view, partly in horizontal section, of the die mechanism of the machine, taken substantially along the line 4—4 of Fig. 1, looking in the direction of the arrows.
Figure 7:
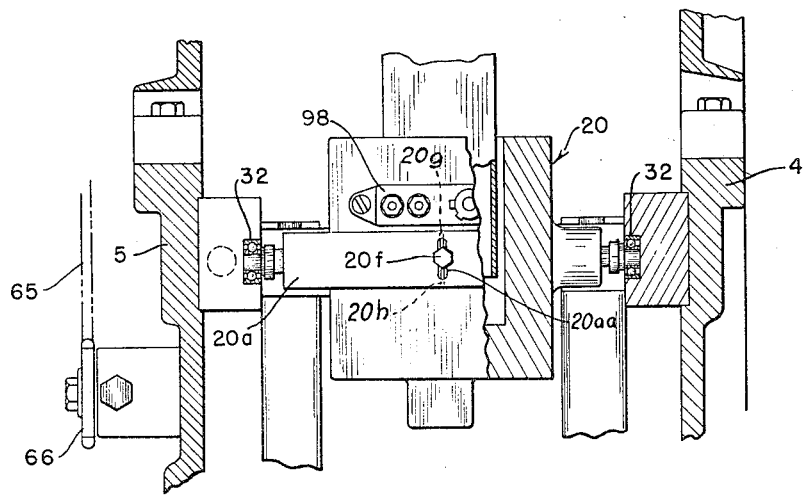
Fig. 7 is an enlarged scale detail vertical sectional view, partly in elevation, of the front of the die and associated parts.

Mounted in the upper extremities of the rocker arms 10 and 11 are ball bearings 10a and 11a (Fig. 4) which engage or press against the heads of pressure and adjusting screws 18a which are found in the pressure bars 18, see Figs. 3 and 4. As pressure bars 18, 18 are forced inwardly by the upper portions of the rocker arms 10 and 11, they compress pressure springs 18b and return springs 18bb. This movement in turn is transmitted to push bars 19 causing these push bars to move inwardly. The inner surfaces of the push bars 19 bear against rear die axles 20a and the inward movement of the push bars is in turn transmitted to opposed sealing dies 20 to bring them to a closed position, as seen in Fig. 4. These rear die axles 20a are fastened at their midpoints to the rear of the dies by pivots 20f which give a single point of suspension for the rear of each die. Each rear die axle 20a carries in its left and right ends or extremities, small stub axles 20b which are journaled in ball bearing assemblies 20c, which provide means for supporting the rear die axles 20a from die tracks 32. The dies 20 also carry, well forward toward their opposed sealing surfaces on both left and right sides, small stub axles 20d which also ride or travel, by means of ball bearing assemblies 20e, in the die tracks 32. The small stub axles 20b, 20d referred to are of the screw-in type and lateral adjustment and alignment of the dies is provided by this screw-in feature. That is to say that any or all of the stub axles 20b, 20d, on either the left or right sides of the dies 20, may be adjusted inwardly or outwardly to provide for proper alignment of the opposing faces of the respective dies, and to provide for proper alignment of the die assembly with proper operating tolerances. Vertical adjustment of the dies is not required other than the adjustment provided at the midpoint of the rear of the die. At the pivot point of each rear die axle the shaft hole or opening for the attaching screw 20f is larger than the shaft of such attaching screw, enabling the rear of the die to be raised, lowered, or moved laterally in relation to the midpoint of the rear die axle. Axle 20a is provided with an upper set screw 20g and a lower set screw 20h which extend into opening 20aa and engage the shaft of cap screw 20f, see Fig. 7, to hold the cap screw in position after the proper adjustment of the die members has been made. The inner end of screw shaft 20f is threaded into the die member 20 which has a socket corresponding in inside diameter to the outside diameter of screw shaft 20f, see Fig. 4. This not only furnishes the means for aligning adjustments of the die assembly, but also provides a three point suspension of the movable die, such suspension being by the two wheels or bearings on the axles in front, and by the midpoint attachment to the rear axle in the rear. In operation, engagement of the dies 20 forms a three-sided bag B from two strips of material making simultaneously vertical side seals $B^2$ and a lateral bottom seal $B^1$ on the opposing strips 100, 100 of the heat-sealable media.

As soon as the cam followers have completed their travel across the top of the main cam 7, they travel down the back side of the cam and the action described previously is reversed. The rocker arms 10 and 11, push rods 8 and 9, pressure bar 18 and push bar 19 are returned to their open positions by means of the return springs 18bb which are mounted on the dowel rods forming an end extension of each die track 32, as clearly shown in Fig. 4. Each of the die assemblies 20 are attached to a push bar 19 by means of a plate P mounting two springs S and as the push bars 19 are returned to their original positions, the die assemblies are also returned to their original spaced and open positions.

At least one of the dies 20 is heated by electrical heating cartridges as described later herein. Sealing of heat sealable media, causing them to fuse, weld or adhere together, is accomplished by applications of heat and pressure, each in varying degrees. Heat adjustments are made by means of an adjustable thermostat 98 mounted on each die. Pressure is regulated by means of the four pressure screws 18a located two on each pressure bar 18. Lengthening of these pressure screws increases, and shortening reduces the pressure.

In comparison to the area of the sealing faces of the dies, the dies themselves are constructed of a relatively heavy mass of metal. The relatively heavy weight of the two opposing dies 20 combined with a power thrust, which derives from a fast throwing action from the cam 7, the transmission of which is above described, and the spacing of the dies causes the dies with the sealable material 100, 100 between them to meet with an impact. Pressure is immediately applied, being transmitted from the cam through the pressure springs which absorb the recoil of the dies and hold them together momentarily under pressure. The impact and the inertia required to stop the opposing fast movement of the heavy dies creates additional heat and a means of obtaining a better and faster transmission and penetration of heat into the portions of the materials to be sealed. Such impact, followed immediately by a momentary retention or application of pressure, provides a fast and uniform heat transmission into the material. The impact makes for the efficiency of the seal because of the fact that it increases the pressure applied and thus increases the efficiency of the transmittal of the heat to the material being formed into bags.

Most or all heat sealable materials require a cooling period to permit the fusion, weld, or seal to harden or "set," and in the present invention, this is provided by a fast release of pressure upon the pressure springs accompanied by the release of tension upon the return springs 18bb by means of a fast drop-off of the cam action, the effect being to snap the dies apart and away from the sealed material. Such fast release action shortens the time interval required for cooling to complete the sealing. Likewise, the combination of the impact action of the heavy dies, which shortens the time interval during which heat and pressure would otherwise have to be applied, and the snap-apart release action of those dies, produces a faster operating cycle than a reciprocating action sealing device would otherwise be likely to obtain in efficient production operation.

Utilizing the principle of the effect of impact or inertia, as above described in the oscillatory die action for the sealing, welding or fusion of heat sealable materials, reduces either or both of the following: (a) the pressure per square inch necessary to be applied upon the opposing die sealing faces, and the length of time such pressure must be maintained; and/or (b) the temperature of the die faces and the length of time such heat must be applied.

The arrangement for suspending the two opposing dies which are moved together with force under impact and with pressure in a precision movement is an important feature of the present invention. The dies are mounted on axle wheels or bearings which ride upon a fixed track. The wheels toward the front or face of the die are permanently aligned so that vertical adjustment of either die is not required. The pivot point attachment of the rear axles to the rear of the dies, permits each to be adjusted upwardly or downwardly, or to the left or right, before being locked into the desired alignment position. Each die may be adjusted toward the left or right by the adjustment feature supplied by the screw-in axles. By means of the described method of suspension and by means of the described method of adjustment the die assembly is capable of being easily, simply and quickly placed and held into a proper operating alignment within precision operating tolerances.

Having described the construction and mechanical operation of the die assembly, we will now describe briefly its operation as a part of the machine of the present invention. It will be noted that the bags or packets are made from two rolled strips of heat sealable material conveniently located toward the front and rear of the machine respectively, and that in operation each strip is brought forward and downward between the faces of the two dies. The fluent material to be packaged is located at the top of the machine, from which, by means of a feeding and metering device to be described, it is measured and delivered into a vertical feeding tube to a position between the opposing die faces, which position is also between the two strips of heat sealable material.

In operation, when the dies are closed by the action above described, a seal is formed on and from the two strips of sealable material, which seal comprises the two side seals of the bag $B^2$ and also the connecting lateral seal $B^1$ at the bottom of the bag. The faces of the dies are approximately U shaped for this purpose. In synchronization with the closure of the opposing die faces which forms and seals a three-sided bag, the measured amount of the fluent material is delivered from the feeding device into the three-sided bag just formed. Upon the opening or separation of the die faces, the strips of sealable material are then advanced by the advancing mechanism to be described, downward a distance equivalent to the desired length of the completed bag where it is again stopped in synchronization with the reciprocating action of the dies. At this point the cycle repeats with the die faces closing against the two strips of sealable material, simultaneously forming the side seals and bottom seal of another bag and the top seal of the three-sided bag just previously formed and filled.

Utilizing a solid single piece of heavy and rigid metal with its face or sealing surface formed in a U shape which will form two side seals and one lateral seal simultaneously, has the advantage of combining the operation of forming side seals with the operation of forming lateral seals in a single movement or operation of a reciprocal acting die assembly. By such means the relationship of side seals and lateral seals is constant and is rigidly fixed. Also by such means such single reciprocating action of opposing dies accomplishes formation of a three-sided bag, enabling it, immediately after or coincidental with closure of the die faces, to be filled while such newly formed three-sided bag is in position between the dies, and thereby providing a simple and efficient means of forming and filling bags at one position in the machine without disturbing such sealing or filling functions by advancing movement of the material. Furthermore, with the bags being formed and shaped as described, the single lateral seal not only comprises the bottom seal margin of the three-sided bag ready for sealing, but also comprises the seal of the top of the bag just previously formed and filled. By this means a single reciprocating action die assembly is utilized to accomplish the sealing in one movement of all four bag sides in synchronization with the filling of such bags.

It should be noted that the width of the lateral portion of the die sealing surface, and therefore the width of the lateral seal made upon the sealable material, is such that it may be cut, generally at its mid-point, separating the bags and leaving the desired sealed margins at the bottom and top of each bag. Furthermore, by utilizing a single set of reciprocating action dies, each die being a single piece and together accomplishing, by a single movement, the complete sealing of the consecutive bags, the advantage of eliminating the necessity of multiple adjustments is obtained since one adjustment of temperature, pressure, dwell time of such pressure, and cooling time is required for proper sealing of sides, bottoms and tops of the consecutive bags.

Figure 11:
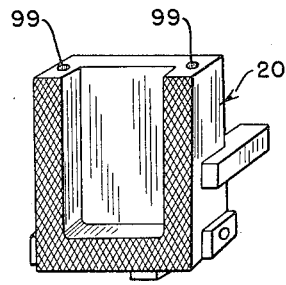
Fig. 11 is a front perspective view of the die of Fig. 10, showing the heat cartridges removed.

It should be noted also that the utilization of a three-sided or U-shaped face upon opposing reciprocating action dies enables the action of the dies themselves to be used in forming or shaping the bag around the stationary feeding-forming tube 36. By accomplishing side seals and bottom seals by the same dies and in the same closing action of the dies, the forming or shaping of the three-sided bag is accomplished in a single action which, upon filling, leaves only the top of the formed and filled bag to be sealed. Each die face is cut out or pocketed between sealing surfaces, see especially Figs. 4 and 11. By means of the shaping of the exterior surface of the feeding-forming tube 36 alone or in conjunction with a shaping of the surface of the die pockets, the shape of the bag can be altered. For example, in the assembly of the machine, as shown in the accompanying drawings, the filling-shaping tube 36 is relatively flat and wide and the die pockets are similarly flat and wide, with the result that the heat sealable material is formed into a bag which is almost flat and is more of a packet than a bag. By thickening or widening the forming-shaping tube, and making corresponding changes where necessary in the shape of the die pocket, the fluent material may be bowed or bulged to form a sealed package which may be decidedly pouched.

The foregoing described construction of the die assembly, its principles of operation, and the above described principles relative to the utilization of the three-sided or U-shaped die face, does not preclude, but on the contrary makes possible, the use of dies having two or more U-shaped sealing surfaces to form and fill two or more bags in a side by side position in each machine cycle. Separate filling-forming or shaping tubes would be used for each of the U-shaped portion of the die sealing surfaces with separate or separated feeds of the fluent material therein, and with the utilization of either separate rolls for each such bag forming position or with suitable means to slit rolls of wider material as it passes through the machine. In other words, although the description herein relates particularly to a die which is U-shaped to form a single bag at a time, the invention also contemplates and embraces the same principles applied to die sets designed to form, fill, and seal in the same manner two, or more bags at a time. Furthermore, the invention as described and as relating to the die assemblies is not limited to the use of two opposing movable dies but includes the use of one movable die operating in a reciprocal action with and against a fixed or immovable corresponding and cooperable die.

By observation of the left side of the present machine, see Fig. 1, it will be seen that the main drive shaft 47 and the rotor shaft 45 are geared together in a one to one ratio by means of a three-eighths inch chain 65 which travels on proper sprockets 62, 63, 64, and 66. Each time the main drive shaft 47 completes one rotation, the metering device rotor 22 also completes one rotation. As the hollow or cavity 22a in the metering device rotor 22 passes beneath and in registry with the bottom end of the hopper or storage receptacle H, it receives a measured charge of the fluent material being packaged from that hopper, and as rotation continues the filled cavity 22a in the rotor device comes into a position over the filling tube 36, where said fluent material contained in the cavity of the rotor 22 is discharged into the filling tube 36 through which it travels or gravitates until it strikes the bottom seal B¹ of the three-sided bag B just formed.

The hopper or storage receptacle H contains a feed screw or auger 24, rotation of which forces the fluent material downward through the narrow bottom portion of the hopper, and which provides a force or compression for filling the pocket or cavity 22a. In a machine which automatically makes bags or packets and fills them with a measured amount of fluent material, it is desirable, if not essential, that uniformity in the weight or volume of the material charges be maintained within an extremely narrow range. Many materials, among which is coffee, will not readily flow from a hopper into a volumetric measuring cup or cavity by gravity alone or by gravity assisted by agitation such as stirring, vibration, etc., with a consistency which will fill the cup or cavity uniformly. Additionally, the difficulty of uniformly filling such a volumetric measuring cavity is increased as the area of the cavity opening is decreased and also as the speed with which the cavity passes through the loading position is increased. Thus, we have found that whereas a close tolerance in the measurement of the weight of ground coffee charges is not obtainable with a volumetric measuring cup alone, practically exact and uniform weights or charges are obtained in the present invention by the combination of an auger or screw feed type of delivery of the coffee to a volumetric measuring cup or cavity. Such combination also makes feasible the use of a relatively small cavity area, a factor which contributes to the elimination of weight variances. It also makes feasible the use of a cavity contained in a rotor which passes through the charging or filling position at a relatively high speed. The latter factor is important not only in that it enables the volumetric measuring device to operate at a high speed on a high speed bag making machine but also in that the speed of the rotor's revolution contributes to the speed and efficiency of the discharge of the fluent material from the volumetric cup. In other words, in that part of the present invention relating to the feeding device shown, by driving the rotor at high speed the cavity in the circumference of the rotor is emptied, not simply by gravity when the cavity revolves to a downward position, but by gravity augmented by the centrifugal force of the rotor's high speed revolution. The commodity is not simply dropped, it is thrust from the cavity.

The discharge of the material in a downward direction into and through the loading tube 36 is facilitated by a jet of air which is so timed that it gives an additional impetus to such discharge, as the cavity 22a in the rotor 22 reaches its proper position in relation to and in registry with the top of the loading tube 36. Proper timing of an air jet device 27 is accomplished by movement of the air jet cam 41 which is found mounted on a stub extension axle 41a on the right hand side of the rotor device, Figs. 3 and 5.

The air jet device 27 comprises a cylinder having a cap 26 provided with a vent hole 26a and a piston 39 mounted on a stem 37. The stem 37 extends through the inner wall of the cylinder of device 27 and provides a cam-engaging extension 38 which is normally forced into engagement with cam 41 by a coiled spring 40, see Fig. 5. A hollow tube 42 connects the cylinder with the metering device casing 21 to convey a blast of air into the cavity 22a when compressed spring 40 is suddenly released as stem 38 drops off cam 41. The air jet or blast is synchronized with the position of the cavity 22a in the revolution of rotor or member 22 by the timed rotation of cam 41 and its shaft 41a.

The bottom of the hollow or cavity 22a in the rotor device is formed by a disk-like plate 22b which is mounted on a screw 22c which makes it possible for this bottom plate of the hollow or cavity 22a to be adjusted up and down as desired to provide a larger or smaller cubic inch capacity for the fluent material to be packaged. To adjust the size of cavity 22a, the plate 22b is provided with a slot 22d to receive a screwdriver, see Fig. 8.

The device, referred to as the "advancing mechanism," moves the two strips 100, 100 of sealable material downward, moving the filled, three-sided bag to a position below the dies where, upon the next closure of the dies, its top or fourth side is sealed. The advancing mechanism is composed of two axles, one of which, namely axle 46, is in fixed position except for rotation and to which power is transmitted (in a one to one ratio) from the main drive shaft 47 by means of chain 65 and sprocket gear 62 (Fig. 1). The other and opposing axle 46a is a floating axle in that it is spring-loaded. Power is transmitted from the fixed rotary axle 46 to the floating rotary axle 46a by means of suitable spur gears.

Each axle, supports two advancing wheels 46b so positioned thereon that those on one axle oppose those on the other axle and grasp the side seals B² of the bags B. The advancing wheels 46b are chamfered out at 46c over a segment or portion of their circumference. As the main drive shaft 47 makes one revolution, the advancing wheels make one revolution, turning inward toward each other and downward. As the circumferences of the opposing wheels engage in the course of such revolution, they grasp the side seals B² of the bags B, drawing the sealable material in a downward direction. Where the chamfered portion of either wheel turns to oppose the other, such wheels disengage, thereby releasing the grasp upon the sealable material and interrupting its advancement. By means of the engaging and disengaging action of the opposing sets of advancing wheels, the sealable material is thus drawn into position between the reciprocating dies 20 where it is stopped for the period allotted to filling and sealing, during which the dies are closed upon the material. Then, upon opening of the dies, the sealable material is moved a distance of one bag length and again stopped, as before. The arc or segment 46e of the circumference of each advancing wheel which is chamfered out is not less than that portion of the revolution of the main drive shaft 47 and cam 7 which occurs while the dies are closed.

By means of a spring 46c at the rear of each end of the floating axle 46a and bearing upon the axle hub, adjustable tension is provided for maintaining a proper friction or pressure of the advancing wheels 46b against their opposites. The floating axle 46a thus automatically adjusts itself to compensate for non-uniform variations in thickness of the sealable material and the spring tension provides the adjustment for regulating the pressure or friction for sealable materials of varying thicknesses. The floating axle also provides the means for adjusting or regulating the distance which each revolution advances the sealable material, which is the factor determining the length of the sealed bag. The floating axle 46a may be pulled backward, disengaging the spur gears and opposing advancing wheels, whereupon such axle and its affixed wheels may be rotated slightly and then released to again engage. When the opposing wheels are positioned so that the segments of their curcumferences, which are not chamfered out, rotate or bear against each other, maximum advancement distance and maximum bag length results. Such distance and bag length may be shortened by changing the relative positions of opposing wheels so that the circumference of one partially faces or opposes the chamfered portion of the opposite wheel. The increments of such adjustment of bag length are determined by the pitch of the spur gears. For example, the bag length may be changed 1/16 inch by changing the relative engaging position of the opposing gears and wheels by one tooth on the gears where the gears are 16 pitch.

Figure 9:
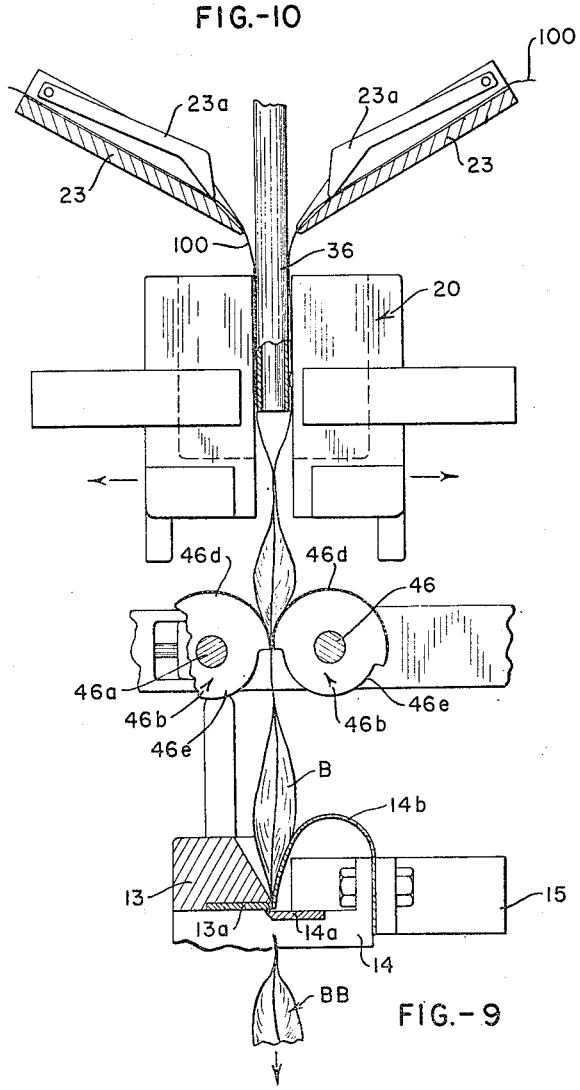
Fig. 9 is an enlarged fragmentary elevational view, partly in section, of the bag forming and advancing mechanism and also the cutoff or knife mechanism of the machine.
Figure 12:
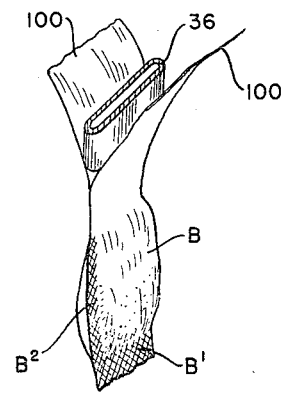
Fig. 12 is a fragmentary perspective view, illustrating one of the bags formed by the machine and having been filled with the commodity, just prior to being sealed along its fourth margin or side and being severed from the strips of material.

Each time the rocker arms 10 and 11 oscillate to cause the dies 20, 20 to come together to form a new bag and to seal the top or fourth side of a previously made bag, they also actuate the knife assembly 13, 14 so that a bag filled and sealed in a previous cycle is cut off from the continuous strip and allowed to fall free of the machine, see bag BB in Fig. 9.

On the rear rocker arm 11 is located a linkage assembly which provides for the actuation of the knife assembly 13, 14. As the lower portion of this rear rocker arm 11 moves outward, it pulls with it, through the medium of the connecting link 33, the linkage assembly including linkage yokes 16 and 17, see Fig. 3, and that outward movement is transmitted to the knife yoke 12 which is pivoted approximately at midpoint on an axle 48. The upper Y-shaped end of the knife yoke 12 then moves inward and forces inward the axle 80 on the knife side plates 29. These knife side plates 29 move inward and bear against the movable knife blade mount 14 causing that movable mount to move toward the stationary knife blade mount 13. As it moves in that direction carrying blade 14a, the two sharpened knife blades 13a and 14a operate with a scissors-like action which slices the material of the bag strips which always are properly positioned between the knife blades. The movable blade mount 14 of the knife assembly is held in juxtaposition with the stationary blade mount 13 by means of sliding guide rods 81, enabling the knife edges to be always held in proper relation with each other.

Figure 6:
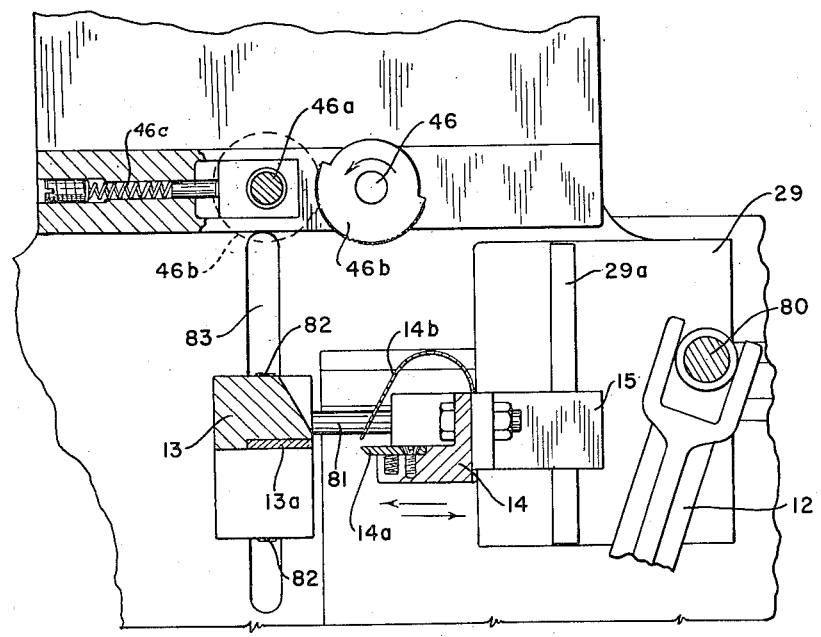
Fig. 6 is an enlarged fragmentary detail view partly in elevation and partly in section, of the knife or cutting means for severing the bags from the strips of fabric material.

The knife assembly can be adjusted vertically by means of four knurled adjusting screws 82, two such being shown in Figs. 2 and 6, which extend through slots 83 (Fig. 6) in the side frames, and when loosened, provide for the manual elevating or lowering of this entire knife assembly. By such adjustment the slicing or cutting action may be performed at any desired point within the lateral seal which forms the bottom sealed margin of one bag B and the top sealed margin of the lower bag BB (Fig. 9). Each time the dies 20 come together to form or seal a bag, the knives 13a, 14a come together to provide the cut-off feature. As the bag length may be varied by means of the advancing mechanism, so also may the location of the point of cut-off be changed or varied by raising or lowering the knife assembly 13, 14. The knife assembly side plates 29 ride on ball bearings in a track in the side frames and these knife side plates are used only to transmit the movement of the knife yoke 12 to the movable knife blade mount 14. Plates 29 also have keys or guides 29a, see Figs. 3 and 6, which cooperate with keyways (not shown) in knife mount 14 to properly guide said mount in its up and down adjustment.

It is important to keep the bags and the bag material from becoming entangled with the blades or cutters 13a and 14a. For this purpose, there is provided a spring guard member 14b, see Figs. 6 and 9, which is mounted on the movable blade mount 14 and whose inner free end overhangs the movable blade 14a. Thus, as bag B descends, it is engaged by the spring guard 14b and is prevented from snagging or catching on the edge of the knife blade 14a. Blade 13a is guarded by the forward inclined shape of its mount and possible snagging of the advancing bag is entirely eliminated.

The supporting means and the feeding means for the sealable container-forming material or strips will now be described. The upper frame portions of the machine serve to support a horizontally disposed bar member 84 which carries at its outer ends spools 85 which are freely and rotatably mounted upon short shafts or axles carried by member 84 and serve to support the rolls VV of sealable material. The strips 100 of the material are fed from the rolls over suitable guides 86, 86 and guide trays 23, 23, see particularly Fig. 3. Each of the guide trays 23 is provided with a gravity-type finger 23a which is pivoted at its upper end and whose lower end lies against the strip of sealable material 100 and serves to hold it flatwise and under constant tension upon the guide trays. The strips 100 are then directed downwardly at opposite sides of the loading and shaping tube 36, as can be clearly seen in Figs. 3 and 9.

Figure 13:
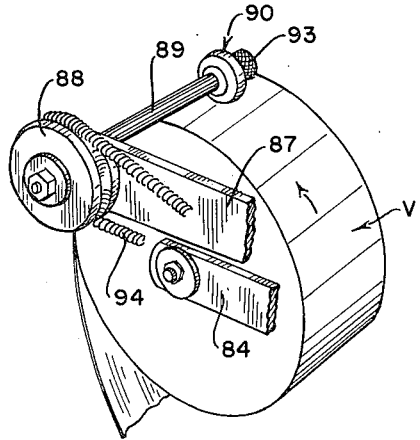
Fig. 13 is an enlarged fragmentary perspective view of one of the fabric turner mechanisms of the machine.
Figure 14:
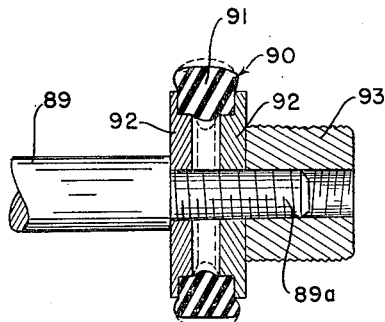
Fig. 14 is an enlarged fragmentary vertical sectional view through one of the fabric engaging and adjustable friction-applying devices of the fabric turner mechanism of the machine.
Figure 15:
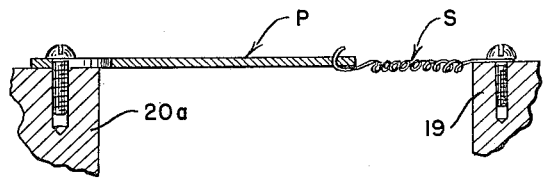
Fig. 15 is a vertical sectional view of one of the die member spring-actuated returning plates shown in Fig. 4.
Figure 16:
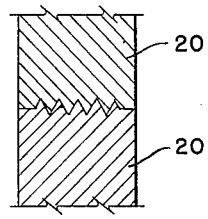
Fig. 16 is an enlarged fragmentary sectional view through a portion of two inter-fitting members as seen in Fig. 4.
Figure 17:
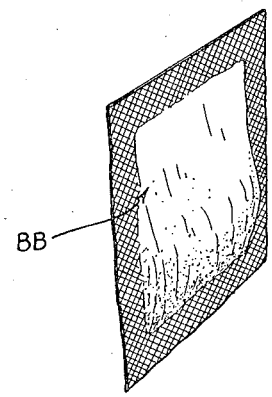
Fig. 17 is a perspective view of one of the completed and commodity-filled bags produced by the machine of the preceding views.

In order to rotate the material rolls V, V in timed relationship with the speed of operation of the metering device 21, 22, the sealable material moving unit, and the cutting unit, therein mounted upon the upper frame portions of the machine above the bar member 84, a pair of pivotally supported or mounted arms 87, each of which carries at its outer end a pulley 88. Pulley 88 is mounted upon a shaft 89, having a reduced threaded end 89a for the purpose of receiving and supporting a friction-applying unit, shown as a whole at 90 in Figs. 13 and 14. This friction-applying unit 90 comprises a rubber ring 91 supported between two metal disk-like plates 92. The unit 90 is held in place upon the shaft end 89a by means of a nut 93. As indicated in Fig. 14, by tightening the nut 93, the plates 92 force the rubber ring outwardly, as shown in broken lines, and thus by adjusting the nut 93 the circumference of ring 91 is increased or decreased to increase or decrease the amount of the sealable material unwound from rolls V.

Figure 5:
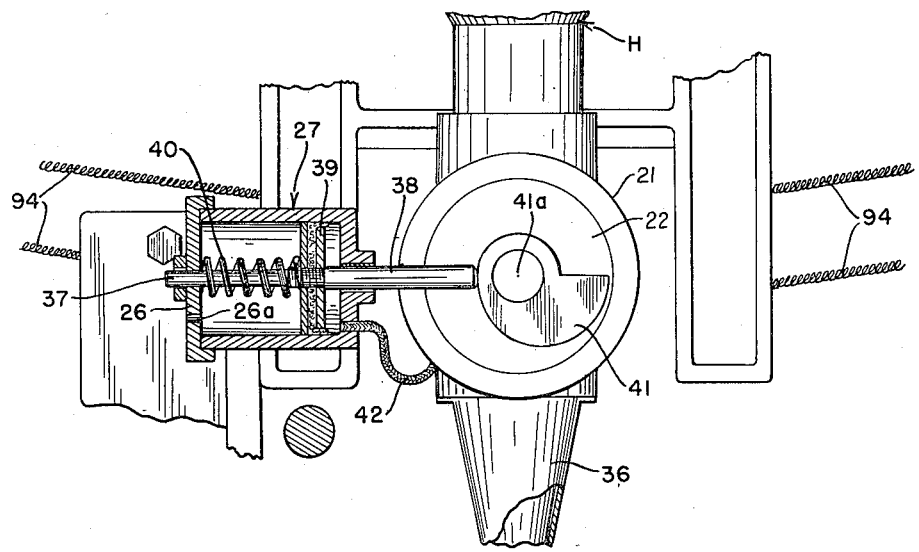
Fig. 5 is an enlarged fragmentary detail elevational view, partly in section, of the metering and air jet means or mechanism for the commodity with which the bags are filled.
Figure 8:
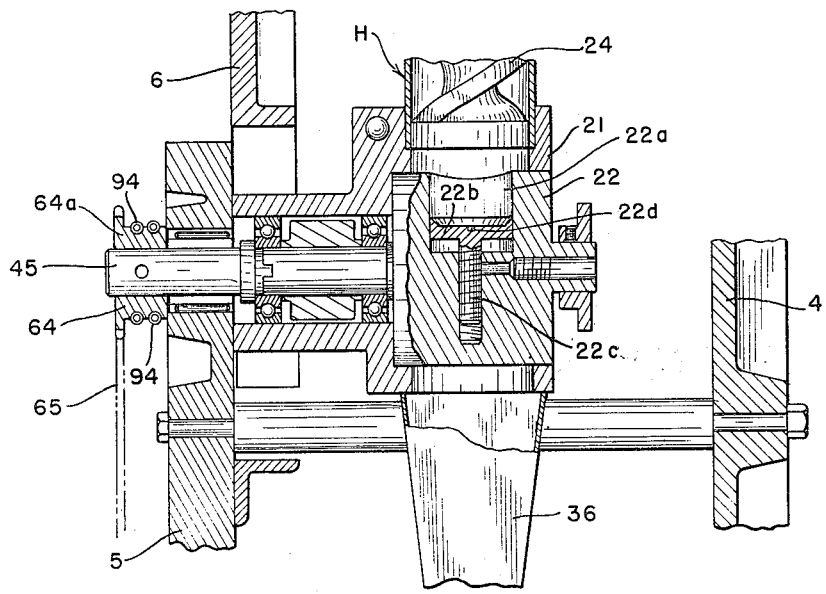
Fig. 8 is an enlarged detail fragmentary vertical sectional view, partly in elevation, of the metering mechanism of the machine.

The material feeding devices 88, 89, 90 are driven in opposite directions by means of a pair of coiled spring belts 94, see Figs. 1 and 5, which run over the pulleys 88 at the ends of arms 87 and whose inner portions engage the hub portion 64a of the sprocket 64, see particularly Figs. 2 and 8. Since the sprocket 64 is in driving relationship with the other sprockets seen in Fig. 1, all said sprockets being drivingly connected together by the sprocket chain 65, the speed of rotation of the friction-applying feeding units 90 will be timed or synchronized with the speed of movement of the other units or elements of the machine under the control of the sprocket chain and connected sprockets. The action is to maintain a looped portion of the sealable material strip 100 beneath each of the rolls V at all times so that the strip advancing mechanism or unit comprising the knurled portions 46b, see Fig. 6, will have two opposed strips of material ready to be moved to coincide with the cycles or sequence of operation of the other units of the machine.

If desirable, the feeding units of the present machine, namely the storage receptacle or hopper H, feed screw or auger 24, motor 74, metering device 21, 22 and the air jet device 27 may be supplanted by one of the well-known interrupted vibration feeding devices, such, for example, as a Syntron feeder, feeding disks, chutes, or any suitable device which would serve the purpose, such as a true auger or screw feeding directly into the formed bag.

Figure 10:
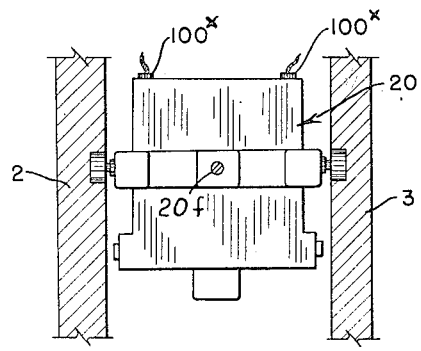
Fig. 10 is a rear elevational view, partly in section, of one of the die members of the machine including the heat cartridges therefor.

With particular reference to the die members or assemblies 20 as viewed in Figs. 2, 7, 10 and 11, each of these die units is provided with electrical heating cartridges, two such being shown at $100^x$ in Fig. 10. These cartridges are preferably located in bores, holes, or cavities 99, see Fig. 11. The preferably three cartridges $100^x$ in each die are wired through an adjustable thermostat, shown generally at 98 in Figs. 2 and 7. This thermostat 98 is preferably of standard design and is, of course, wired through the die and connected with suitable electric wiring (not shown) so as to accurately control the temperature of the dies. This temperature will, of course, vary in accordance with the fluent material being bagged by the machine and also in accordance with the type of material from which the bags are formed. By referring to Fig. 2, it will be seen that the switch panel 95 supports a pair of signal lights 96 and 97, one for each of the die members. As shown, the switch panel 95 is provided with a switch 101 for controlling the heat, a switch 102 for the electric motor 74 which operates the so-called hopper drive, and a similar switch 103 which is provided for the purpose of controlling current to the electric motor for the main drive of the machine.

We claim:

1. In a machine for producing sealed unitary containers of fluent material having a supporting structure, the combination of a storage receptacle for fluent material to be packaged mounted at the upper portion of said structure and having a bottom discharge opening, a feed screw positioned to move fluent matter through said opening for gravitational discharge, a centrifugal measuring device having an upper intake opening for the reception of a measured amount of the discharge of fluent matter through said discharge opening in each revolution and having a lower discharge outlet for the passage of said measured amount in each revolution and having a rotor for moving the measured amount from the intake to the outlet, means associated with said rotor for directing an air blast discharge to the fluent matter in the rotor when the same is in registry with the discharge outlet, an elongated hollow loading and shaping device positioned and arranged to receive and conduct said measured discharge to a remote point of discharge between enclosing media, means for positioning two strips of heat sealable enclosing media separated by the loading and shaping device at said point of discharge with a unit defined by abutting side and bottom surfaces heat sealed by sealing action on the next lower unit along the strips, means for imparting unitary increments of movement to said strips so as to bring the filled enclosure out of register with said loading and shaping device, co-active die members positioned on said structure for movement into heat sealing engagement with the filled enclosure at the end of said increment of movement and arranged to heat-seal the top of the filled enclosure to form the unitary container and simultaneously heat-seal the bottom and sides of the enclosure next above, and means positioned along the path of movement of said units for severing the respective strips in the sealed top and bottom areas.

2. In a machine for producing sealed unitary containers of fluent material having a supporting structure, the combination of a storage receptacle for fluent material to be packaged mounted at the upper portion of said structure and having a bottom discharge opening, a feed screw positioned to move fluent matter through said opening for gravitational discharge, a centrifugal measuring device having an upper intake opening for the reception of a measured amount of the discharge of fluent matter through said discharge opening in each revolution and having a lower discharge outlet for the passage of said measured amount in each revolution and having a rotor for moving the measured amount from the intake to the outlet, means associated with said rotor for directing an air blast discharge to the fluent matter in the rotor when the same is in registry with the discharge outlet, an elongated hollow loading and shaping device positioned and arranged to receive and conduct said measured discharge to a remote point of discharge between enclosing media, means for positioning two strips of heat sealable enclosing media separated by the loading and shaping device at said point of discharge with a unit defined by abutting side and bottom surfaces heat sealed by sealing action on the next lower unit along the strips, means for imparting unitary increments of movement to said strips so as to bring the filled enclosure out of register with said loading and shaping device, co-active die members positioned on said structure for movement into heat sealing engagement with the filled enclosure at the end of said increment of movement and arranged to heat-seal the top of the filled enclosure to form the unitary container and simultaneously heat-seal the bottom and sides of the enclosure next above, means positioned along the path of movement of said units for severing the respective strips in the sealed top and bottom areas, and oscillatable means for imparting linear movement to said co-active die members.

3. In a machine for producing sealed unitary containers of fluent material having a supporting structure, the combination of a storage receptacle for fluent material to be packaged mounted at the upper portion of said structure and having a bottom discharge opening, a feed screw positioned to move fluent matter through said opening for gravitational discharge, a centrifugal measuring device having an upper intake opening for the reception of a measured amount of the discharge of fluent matter through said discharge opening in each revolution and having a lower discharge outlet for the passage of said measured amount in each revolution and having a rotor for moving the measured amount from the intake to the outlet, means associated with said rotor for directing an air blast discharge to the fluent matter in the rotor when the same is in registry with the discharge outlet, an elongated loading and shaping device positioned and arranged to receive and conduct said measured discharge to a remote point of discharge between enclosing media, means for positioning two strips of heat sealable enclosing media separated by the loading and shaping device at said point of discharge with a unit defined by abutting side and bottom surfaces heat sealed by sealing action on the next lower unit along the strips, means for imparting unitary increments of movement to said strips so as to bring the filled enclosure out of register with said loading and shaping device, co-active die members positioned on said structure for movement into heat sealing engagement with the filled enclosure at the end of said increment of movement and arranged to heat-seal the top of the filled enclosure to form the unitary container and simultaneously heat-seal the bottom and sides of the enclosure next above, means positioned along the path of movement of said units for severing the respective strips in the sealed top and bottom areas, oscillatable means for imparting linear movement to said co-active die members to effect an impact thereof during their closing movement, and means for imparting a fast release of said die members after said impact action.

4. In a machine for producing sealed unitary containers of fluent material having a supporting structure, the combination of a storage receptacle for fluent material to be packaged mounted at the upper portion of said structure and having a bottom discharge opening, a feed screw positioned to move fluent matter through said opening for gravitational discharge, a centrifugal measuring device having an upper intake opening for the reception of a measured amount of the discharge of fluent matter through said discharge opening in each revolution and having a lower discharge outlet for the passage of said measured amount in each revolution and having a rotor for moving the measured amount from the intake to the outlet, an elongated hollow loading and shaping device positioned and arranged to receive and conduct said measured discharge to a remote point of discharge between enclosing media, means for positioning two strips of heat sealable enclosing media separated by the loading and shaping device at said point of discharge with a unit defined by abutting side and bottom surfaces heat sealed by sealing action on the next lower unit along the strips, means for imparting unitary increments of movement to said strips so as to bring the filled enclosure out of register with said loading and shaping device, co-active die members positioned on said structure for movement into heat sealing engagement with the filled enclosure at the end of said increment of movement and arranged to heat-seal the top of the filled enclosure to form the unitary container and simultaneously heat-seal the bottom and sides of the enclosure next above, means positioned along the path of movement of said units for severing the respective strips in the sealed top and bottom areas, oscillatable means for imparting a linear movement of the dies to cause an impact thereof during their closing and sealing movement, spring means associated with said dies for absorbing the impact, and spring means for causing a fast opening movement and separation of the dies after said impact action.

5. In a machine for producing sealed unitary containers of fluent material having a supporting structure, the combination of a storage receptacle for fluent material to be packaged mounted at the upper portion of said structure and having a bottom discharge opening, a feed screw positioned to move fluent matter through said opening for gravitational discharge, a centrifugal measuring device having an upper intake opening for the reception of a measured amount of the discharge of fluent matter through said discharge opening in each revolution and having a lower discharge outlet for the passage of said measured amount in each revolution and having a rotor for moving the measured amount from the intake to the outlet, means associated with said rotor for directing an air blast discharge to the fluent matter in the rotor when the same is in registry with the discharge outlet, an elongated hollow loading and shaping device positioned and arranged to receive and conduct said measured discharge to a remote point of discharge between enclosing media, means for positioning two strips of heat sealable enclosing media separated by the loading and shaping device at said point of discharge with a unit defined by abutting side and bottom surfaces heat sealed by sealing action on the next lower unit along the strips, means for imparting unitary increments of movement to said strips so as to bring the filled enclosure out of register with said loading and shaping device, co-active die members positioned on said structure for movement into heat sealing engagement with the filled enclosure at the end of said increment of movement and arranged to heat-seal the top of the filled enclosure to form the unitary container and simultaneously heat-seal the bottom and sides of the enclosure next above, means for severing the respective strips in the sealed top and bottom areas, said means comprising a fixed knife blade and a reciprocable knife blade movable into and out of engagement with the fixed knife blade for severing said strips, and means for operating the reciprocable knife blade.

6. A machine according to claim 5, wherein the fixed knife blade and the reciprocable knife blade are bodily adjustable in an upright path whereby to permit severing of the respective strips at points located at different distances from said co-active die members.

7. In a machine for producing sealed unitary containers of fluent material having a supporting structure, the combination of a storage receptacle for fluent material to be packaged mounted at the upper portion of said structure and having a bottom discharge opening, a feed screw positioned to move fluent matter through said opening for gravitational discharge, a centrifugal measuring device having an upper intake opening for the reception of a measured amount of the discharge of fluent matter through said discharge opening in each revolution and having a lower discharge outlet for the passage of said measured amount in each revolution and having a rotor for moving the measured amount from the intake to the outlet, means associated with said rotor for directing an air blast discharge to the fluent matter in the rotor when the same is in registry with the discharge outlet, an elongated hollow loading and shaping device positioned and arranged to receive and conduct said measured discharge to a remote point of discharge between enclosing media, means for positioning two strips of heat sealable enclosing media separated by the loading and shaping device at said point of discharge with a unit defined by abutting side and bottom surfaces heat sealed by sealing action on the next lower unit along the strips, means for imparting unitary increments of movement to said strips so as to bring the filled enclosure out of register with said loading and shaping device, co-active die members positioned on said structure for movement into heat sealing engagement with the filled enclosure at the end of said increment of movement and arranged to heat-seal the top of the filled enclosure to form the unitary container and simultaneously heat-seal the bottom and sides of the enclosure next above, said co-active die members having substantially U-shaped sealing surfaces, means for heating the die members, and cutting means positioned along the path of movement of said units and below the die members for severing the respective strips in the sealed top and bottom areas.

8. In a machine for producing sealed unitary containers of fluent material having a supporting structure, the combination of a storage receptacle for fluent material to be packaged mounted at the upper portion of said structure and having a bottom discharge opening, a feed screw positioned to move fluent matter through said opening for gravitational discharge, a centrifugal measuring device having an upper intake opening for the reception of a measured amount of the discharge of fluent matter through said discharge opening in each revolution and having a lower discharge outlet for the passage of said measured amount in each revolution and having a rotor for moving the measured amount from the intake to the outlet, means associated with said rotor for directing an air blast discharge to the fluent material in the rotor when the same is in registry with the discharge outlet, an elongated hollow loading and shaping device positioned and arranged to receive and conduct said measured discharge to a remote point of discharge between enclosing media, means for positioning two strips of heat sealable enclosing media separated by the loading and shaping device at said point of discharge with a unit defined by abutting side and bottom surfaces heat sealed by sealing action on the next lower unit along the strips, means for imparting unitary increments of movement to said strips so as to bring the filled enclosure out of register with said loading and shaping device, co-active die members positioned on said structure for movement into heat sealing engagement with the filled enclosure at the end of said increment of movement and arranged to heat-seal the top of the filled enclosure to form the unitary container and simultaneously heat-seal the bottom and sides of the enclosure next above, oscillatable means for imparting linear movement to said co-active die members, said die members having substantially U-shaped sealing surfaces, and means positioned along the path of movement of said unit for severing the respective strips at predetermined points.

9. In a machine for producing sealed unitary containers of fluent material having a supporting structure, the combination of a storage receptacle for fluent material to be packed mounted at the upper portion of said structure and having a bottom discharge opening, a feed screw positioned to move fluent matter through said opening for gravitational discharge, a centrifugal measuring device having an upper intake opening for the reception of a measured amount of the discharge of fluent matter through said discharge opening in each revolution and having a lower discharge outlet for the passage of said measured amount in each revolution and having a rotor for moving the measured amount from the intake to the outlet, means associated with said rotor for directing an air blast discharge to the fluent material in the rotor when the same is in registry with the discharge outlet, an elongated hollow loading and shaping device positioned and arranged to receive and conduct said measured discharge to a remote point of discharge between enclosing media, means for positioning two strips of heat sealable enclosing media separated by the loading and shaping device at said point of discharge with a unit defined by abutting side and bottom surfaces heat sealed by sealing action on the next lower unit along the strips, means for imparting unitary increments of movement to said strips so as to bring the filled enclosure out of register with said loading and shaping device, co-active die members positioned on said structure for movement into heat sealing engagement with the filled enclosure at the end of said increment of movement and arranged to heat-seal the top of the filled enclosure to form the unitary container and simultaneously heat-seal the bottom and sides of the enclosure next above, oscillatable means for imparting linear movement to the co-active die members to close the same with an impact action, means for causing the reverse linear movement of the dies to cause a rapid separation thereof, and means positioned along the path of movement of said units for severing the respective strips at predetermined points.

10. A machine according to claim 4 in which the oscillatable means includes a linearly reciprocating die push bar mounted for imparting linear movement to each said die, and in which said impact absorbing spring means and said separating spring means bear against opposed faces of said die push bar.

11. A machine according to claim 4 in which the oscillatable means includes a linearly reciprocating die push bar aligned with and mounted for imparting linear movement to each of said dies, and in which said impact absorbing spring means includes a pair of springs bearing against a face of said die push bar adjacent the ends thereof, and said separating spring means includes a pair of springs bearing against an opposed face of said push bar and aligned with said impact absorbing springs.

12. In an automatic bag making, filling and sealing machine having a frame structure and power operating means carried thereby, the combination of a supply hopper for supplying a fluent material to the successively formed bags, a loading and shaping tube for delivering the fluent material from the hopper to said bags, means for positioning two strips of heat sealable material so as to be separated by said tube, means for supporting the two strips of heat sealable material from which the successive bags are formed, means for moving the strips into opposed relationship with each other and with the loading and shaping tube, opposed heated movable die members at opposite sides of said loading and shaping tube for forcing the opposed strips together under pressure and with an impact by a closing movement to form a bag therefrom heat sealed on three sides thereof, means disposed between the hopper and the loading and shaping tube and in communication with both thereof for measuring a predetermined quantity of the fluent material and delivering it into said bag through the opening in its unsealed fourth side, means associated with said measuring means for directing an air blast discharge to the fluent material at a predetermined time to discharge the material from the measuring means, said moving means shifting the filled bag downwardly whereby the next closing movement of the die members to seal three sides of the next bag also simultaneously seals the fourth side of the previously sealed and filled bag, and cutting means operating to cut the bag through its fourth sealed side during the next cycle of operation of the machine to sever it from the bag next above.

13. In an automatic bag forming, filling and sealing machine having a base, frame and electric motor drive, the combination of a fluent material hopper for supplying the same to the bag, a loading and shaping tube for delivering the fluent material from the hopper to the bag, means for positioning two strips of heat sealable material so as to be separated by said tube, means for supporting the two strips of heat sealable material from which the bag is to be formed, means for advancing the strips simultaneously into opposed relationship with each other and on opposite sides of the loading and shaping tube, opposed movable and heated die members disposed in trackways and located at opposite sides of the loading and shaping tube, means for forcing said die members together under pressure and with an impact to move the opposed strips together to form a bag with the bottom and two sides thereof sealed, a fluent material measuring device between the hopper and the loading and shaping tube to supply a predetermined quantity of the fluent material to the bag through the open top thereof, means associated with said measuring device for directing an air blast discharge to the fluent material in the measuring device at a predetermined time to discharge said material from the device, said strips advancing means moving the filled bag to a lower position with relation to the die members where the die members function to seal the top side thereof, and cutting means movable into engagement with the filled and sealed bag to sever it from the heat sealable strips.

14. A machine according to claim 13, wherein the two strips of heat sealable material are contained on two separate rolls freely rotatable on spools mounted in the vicinity of the fluent material measuring device, and wherein power-driven friction strip-engaging means are provided for feeding the strips from said rolls in timed relation to the operation of the fluent material feeding, measuring, bag-forming, filling, sealing and severing means or mechanism of the machine.

15. In a machine for producing sealed unitary containers of fluent material, in which the machine includes a supporting structure, a storage receptacle for the fluent material, a measuring device for said material in communication with the storage receptacle, means associated with said measuring device for directing an air blast discharge to the fluent material in the measuring device at a predetermined time to discharge said material from the device, a loading and container-shaping device to receive and conduct a measured discharge from the measuring device to a point of discharge between enclosing media, means for positioning two strips of heat sealable enclosing media in association with the loading and container-shaping device, means for imparting unitary increments of movement to said strips, and co-active die members positioned on said structure for movement into heat sealing engagement with the two strips, means providing a three-point suspension for each of said die members so as to permit limited self-aligning movement of each die, adjusting means for aligning the die members with each other, and means for severing the strips with a scissors-like action.

16. In a machine for producing sealed unitary containers of fluent material, a supporting structure, a storage receptacle for the fluent material, a measuring device for said material in communication with the storage receptacle, a loading and container-shaping device to receive and conduct a measured discharge from the measuring device to a point of discharge between enclosing media, means for contacting two strips of flexible enclosing media in association with the loading and container-shaping device, means for imparting unitary increments of movement to said strips, and co-active die members positioned on said structure for movement into sealing engagement with the two strips, cutting means movable into engagement with the strips of flexible enclosing media to separate the successive filled and sealed bags from the remainder of said strips, the cutting means including a fixed cutter die and blade and a movable cutter die and blade, and a spring-like guard member carried on the movable cutter die and bearing against the strips during the severing action to prevent entanglement of the sealed container being severed from the strips of flexible material.

17. A machine according to claim 16 in which the spring-like guard member includes a media contacting surface inclining downwardly so as to direct descending strips of enclosing media out of the vertical plane of the cutting means.

18. In a machine for packaging fluent material in predetermined measured quantities in flexible enclosing media and having a supporting structure, means on the supporting structure for storing a quantity of fluent material, means on the supporting structure associated with the storing means for receiving and measuring an amount of said fluent material fed from the storing means, means for delivering the measured amount of fluent material to the enclosing media, means associated with the fluent material receiving and measuring means for directing an air blast discharge to the measured amount of fluent material at a predetermined time to discharge said measured amount from said receiving and measuring means, die means for sealing the enclosing media around the measured amount of contained material to form a packet with sealed sides and bottom surfaces to hold said fluent material, means for actuating said die means, and advancing means including a flexible media-contacting member for moving the enclosing media into position to receive the first sealing action of the die means, said advancing means also moving said packet into position to receive the next sealing action of said die means to thereby complete the sealing of said packet at the top.

19. In an automatic bag forming, filling and sealing machine having a base, frame and electric motor drive, the combination of a fluent material hopper for supplying the same to the bag, a loading and shaping tube for delivering the fluent matter from the hopper to the bag, means including two rotatable spools for positioning two strips of heat sealable material so as to be separated by said tube, means for advancing the strips simultaneously into opposed relationship with each other on opposite sides of the loading tube, means for forcing said die members together under impact and pressure to move the opposed strips together to form a bag with the bottom and two sides thereof sealed, strip-engaging means for feeding the strips from said rolls in synchronized relation to the movement of said strips by said advancing means and including a shaft, two metal discs on the shaft, and a yieldable rubber ring of greater diameter than the discs disposed between said discs, for engaging the strip, and an adjusting means carried by the shaft for moving the discs toward and away from each other whereby to increase or decrease the circumferential extent of the rubber surface acting on said strips.

20. Structure as defined in claim 18, in which cam means control the die movements and are synchronized with the media advancing means.

21. In a fluent material packaging machine in which measured amounts of a fluent material are delivered to enclosing media, a fluent material supply hopper, a material measuring device disposed below the hopper for receiving the hopper discharge, and means in the hopper for discharging fluent material under pressure, said measuring device comprising a housing, a centrifugal rotor in the housing having a cavity for reception of fluent material movable by the centrifugal action from a loading position to a discharge position, and means associated with said cavity for directing an air blast discharge to its contents at said discharge position.

22. Structure as defined n claim 21 including means for varying the volumetric capacity of said cavity.

23. Structure as defined in claim 21 in which the rotor has a horizontal axis of rotation and the discharge position is at the bottom and substantially 180° from the loading position.

References Cited in the file of this patent

UNITED STATES PATENTS

| | | |
|---|---|---|
| 529,908 | Hill | Nov. 27, 1894 |
| 2,336,962 | Salfisberg | Dec. 14, 1943 |
| 2,350,930 | Salfisberg | June 6, 1944 |
| 2,381,091 | Weisman | Aug. 7, 1945 |
| 2,385,229 | Patterson | Sept. 18, 1945 |